(12) United States Patent
Yagi et al.

(10) Patent No.: US 9,250,837 B2
(45) Date of Patent: Feb. 2, 2016

(54) IMAGE FORMING SYSTEM AND IMAGE FORMING METHOD

(71) Applicants: Kabushiki Kaisha Toshiba, Tokyo (JP); Toshiba Tec Kabushiki Kaisha, Tokyo (JP)

(72) Inventors: Norifumi Yagi, Tokyo (JP); Takao Ishida, Kanagawa-ken (JP); Mamoru Nomura, Tokyo (JP); Kanya Hiroi, Kanagawa-ken (JP); Hiroshi Hashidume, Tokyo (JP); Kazuhiro Ogura, Kanagawa-ken (JP); Minoru Yoshida, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/045,588

(22) Filed: Oct. 3, 2013

(65) Prior Publication Data
US 2015/0098107 A1    Apr. 9, 2015

(51) Int. Cl.
G06K 15/02    (2006.01)
H04N 1/00    (2006.01)
H04N 1/034    (2006.01)
G06F 3/12    (2006.01)

(52) U.S. Cl.
CPC .............. *G06F 3/1219* (2013.01); *G06F 3/126* (2013.01); *G06F 3/1254* (2013.01)

(58) Field of Classification Search
CPC ........................... H04N 1/2369; G06F 3/1219
See application file for complete search history.

(56) References Cited

U.S. PATENT DOCUMENTS

| | | | |
|---|---|---|---|
| 2010/0239275 A1* | 9/2010 | Yamade | 399/39 |
| 2010/0271410 A1* | 10/2010 | Kaneko et al. | 347/6 |
| 2011/0199625 A1* | 8/2011 | Sugimoto et al. | 358/1.9 |
| 2011/0205601 A1* | 8/2011 | Akimoto | G03G 21/046 358/475 |
| 2011/0211033 A1* | 9/2011 | Yahata et al. | 347/179 |
| 2011/0310422 A1 | 12/2011 | Hagiwara | |
| 2012/0038941 A1* | 2/2012 | Megawa | G03G 15/6585 358/1.13 |
| 2012/0069395 A1* | 3/2012 | Hiraike | 358/1.15 |
| 2012/0092713 A1* | 4/2012 | Hagiwara | 358/1.15 |
| 2012/0170064 A1* | 7/2012 | Hibino et al. | 358/1.9 |
| 2013/0182283 A1* | 7/2013 | Kavanapillil et al. | 358/1.15 |

FOREIGN PATENT DOCUMENTS

JP    2012-155566    *    8/2012    ............. G06F 21/24

* cited by examiner

*Primary Examiner* — Beniyam Menberu
(74) *Attorney, Agent, or Firm* — Patterson & Sheridan, LLP

(57) ABSTRACT

An image forming system according to an embodiment comprises a data creation section configured to create document data, and a print instruction section configured to send instructions to print the document data. The image forming section further comprises a printing mode determination section configured to determine a printing mode of the document data based on property information of the document data, and a selection section configured to select for printing the document data with one of a non-erasable image forming section and an erasable image forming section based on the determined printing mode.

17 Claims, 12 Drawing Sheets

| CONFIDENTIALITY KEYWORD | SECRET, CONFIDENTIAL, INTERNAL USE ONLY, DUPLICATION PROHIBITED |

| 96 | 97a | 97b | 97c PROPERTY INFORMATION 97d | | 97e | 97f | 97g 98 |
|---|---|---|---|---|---|---|---|
| | | | | | | FREQUENCY OF CONFIDENTIALITY KEYWORD (AVERAGE/PAGE) | PRINT RECORD (USER, PRINT DATE, PRINTING MODE) |
| T0001 | SUMMARY OF MFP PRODUCTS | DOC | INTERNAL | TECHNICAL MATERIALS | 10 | 012399 | 2 |
| T0002 | STRATEGY FOR XX | PPT | INTERNAL | MATERIALS FOR MANAGEMENT CONFERENCE | 3 | 045563 | 4 |
| T0003 | EXPLANATORY CONFERENCE NOTICE | DOC | INTERNAL | CONFERENCE NOTICE | 1 | 012274 | 0 |
| | | | | | | | |
| | | | | | | | |

FIG. 15

| No. | REGISTERED DOCUMENT SUMMARY 131b | 131c | 131d | 131e |
|---|---|---|---|---|
| T001 | SUMMARY OF MFP PRODUCTS | 2012/09/28 11:00 | PPT | 56K |

DOCUMENT PRINTING

ECO PRINT DESIGNATION ☐ ECO MFP (PLEASE CHECK IF YOU DESIGNATE ECO PRINT)

133

CANCEL   PRINT 132a   132b 131, 131a, 130

FIG. 18

| PRINTING POLICY | DOCUMENT DISTRIBUTION DESTINATION | DOCUMENT TYPE | FREQUENCY OF CONFIDENTIALITY KEYWORD | APPLICATION |
|---|---|---|---|---|
| (1) | EXTERNAL, INTERNAL | MATERIALS FOR MANAGEMENT CONFERENCE, DESIGN MATERIALS, SALES DATA, PERSONAL INFORMATION | A PAGE HAVING ONE/PAGE OR MORE IS PRESENT | PPT、xls |
| (2) | EXTERNAL | MATERIALS FOR MANAGEMENT CONFERENCE, PERSONAL INFORMATION | A PAGE HAVING TWO/PAGE OR MORE IS PRESENT | PPT |
| (3) | EXTERNAL | PERSONAL INFORMATION | A PAGE HAVING THREE/PAGE OR MORE IS PRESENT | PPT |

IMAGE FORMING SYSTEM AND IMAGE FORMING METHOD

FIELD

Embodiments described herein relate generally to an image forming system and an image forming method in which a non-erasable printer and an erasable printer are connected by a network.

BACKGROUND

There is an image forming system in which a non-erasable printer and an erasable printer are connected to a network. In the image forming system in which the non-erasable printer and the erasable printer are connected, a method is known in which the user selects any one of the non-erasable printer or the erasable printer when each print job is generated.

DESCRIPTION OF THE DRAWINGS

FIG. 12 illustrates an example document registration list, according to the second embodiment.

FIG. 15 illustrates a printer driver screen on a PC, according to the second embodiment.

FIG. 18 illustrates printing policy items, according to a third embodiment.

DETAILED DESCRIPTION

An image forming system according to an embodiment comprises a data creation section configured to create document data, and a print instruction section configured to send instructions to print the document data. The image forming section further comprises a printing mode determination section configured to determine a printing mode of the document data based on property information of the document data, and a selection section configured to select for printing the document data with one of a non-erasable image forming section and an erasable image forming section based on the determined printing mode.

Hereafter, the embodiments will be described.

(First Embodiment)

Figure 1:
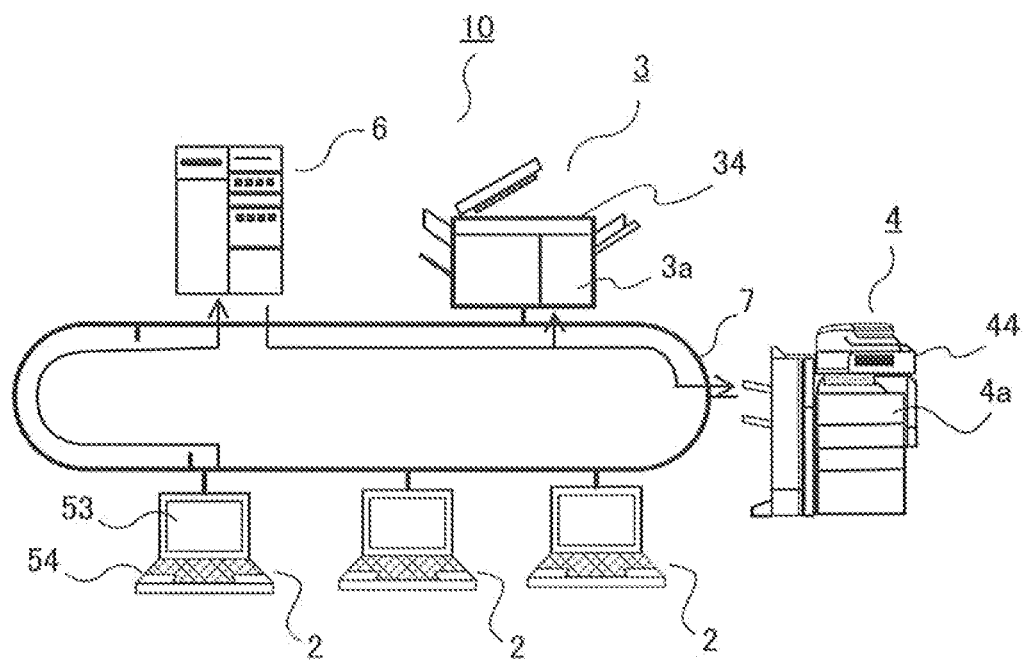
FIG. 1 illustrates an image forming system, according to a first embodiment.
Figure 2:
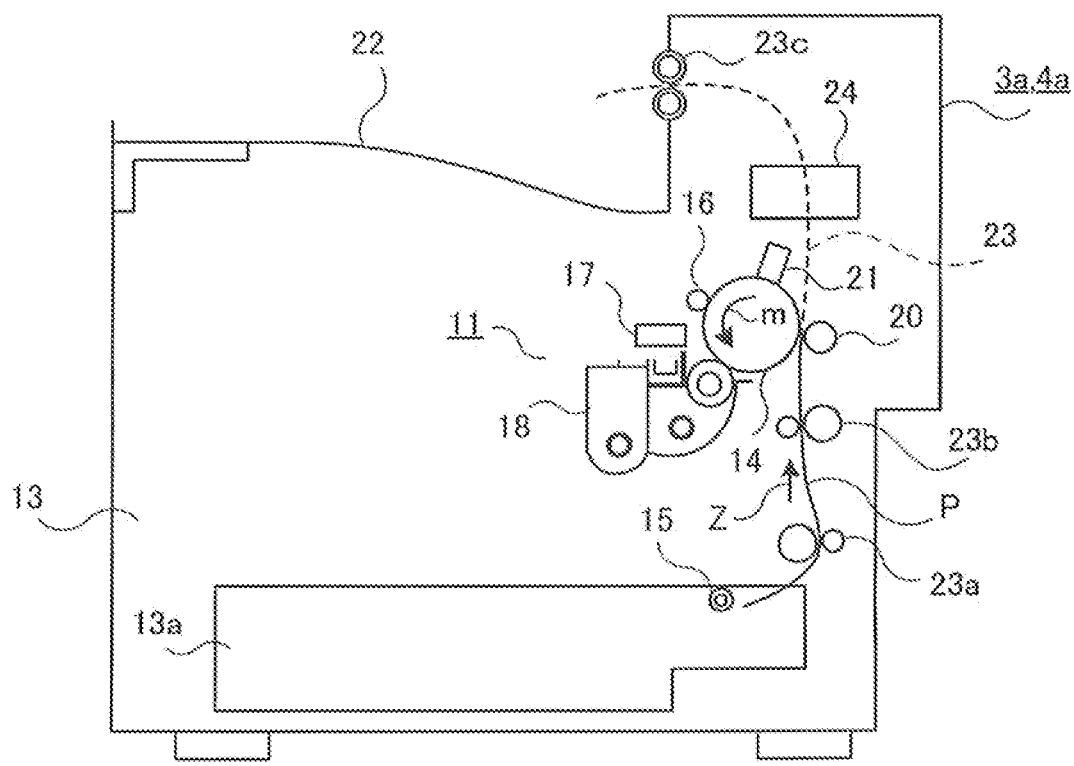
FIG. 2 illustrates a printer, according to the first embodiment.

An image printing system according to a first embodiment will be described with reference to FIG. 1 through FIG. 9. FIG. 1 illustrates the image forming system 10, according to the first embodiment. The image forming system 10 connects, for example, a PC (personal computer) 2, a non-erasable MFP (Multi-Function-Peripheral) 3 which is a non-erasable image forming section, an erasable MFP 4 which is an erasable image forming section, and a server 6, each connected via a LAN (Local Area Network) 7. The PC 2 acts as a data creation section and a printing instruction section. The server 6 acts as a printing mode determination section configured to determine the printing mode in the image forming system 10 and as a selection section configured to select the non-erasable MFP 3 or the erasable MFP 4. The printing mode is a non-erasable mode in which a non-erasable coloring material is used or a erasable mode in which an erasable coloring material is used.

The PC 2, the non-erasable MFP 3, the erasable MFP 4 and the server 6 and the like are connected to the LAN 7 and have a communication function to perform a data communication respectively. The communication function may be realized by a cloud network. The number or the types of the PC 2, the non-erasable MFP 3, the erasable MFP 4 and the server 6 are not limited. The LAN (Local Area Network 7) may be realized by wired or wireless communications.

The PC 2 includes application software that creates document data. The application software is, for example, PPT (Power Point®), XLS (Excel®), txt (Text editor) and the like. The PC 2 includes a printer driver to print the document data using the non-erasable MFP 3 or the erasable MFP 4. For the data creation section or the printing instruction section, a user terminal such as a smart phone or a mobile terminal may be used, and is not limited to the PC. The server 6 administers a print job instructed by the PC 2, for example.

The non-erasable MFP 3 is capable of printing the print data created by the PC 2 in the non-erasable mode using the non-erasable coloring material, for example. The printed image on the sheet printed by the non-erasable MFP 3 does not fade out by heating, for example. In case of printing by the non-erasable MFP 3, the sheet cannot be reused.

The erasable MFP 4 is capable of printing the print data created by the PC 2 in the erasable mode, using the erasable coloring material, for example. The printed image on the sheet printed by the erasable MFP 4 fades out by heating, for example. In case of printing by the erasable MFP 4, the printed image can be erased by heating the sheet after the printing. The sheet in which the printed image is erased can be reused.

Each of printers 3a and 4a of the non-erasable MFP 3 and the erasable MFP 4 will be described. The configurations of the printers 3a and 4a of the non-erasable MFP 3 and the erasable MFP 4 are similar, except that the coloring materials of the developer thereof used for image forming are different. Accordingly, the printers 3a and 4a will be described using the common reference numerals with reference to FIG. 2.

Each of the printers 3a or 4a of the non-erasable MFP 3 or the erasable MFP 4, prints by an electro-photographic system. The printers 3a and 4a, for example, include an image forming station 11, a sheet feeder 13, a sheet discharging unit 22, a transportation unit 23 and a fixing device 24.

The image forming station 11 includes a charger 16, an exposure scanning head 17, a developing device 18, a transfer device 20, and a cleaner 21 around the photosensitive drum 14 rotating in arrow m direction. The charger 16 charges the photosensitive drum 14. The exposure scanning head 17 irradiates exposure light to the photosensitive drum 14 based on the print data to form an electrostatic latent image on the photosensitive drum 14.

The developing device 18 supplies toner to the electrostatic latent image on the photosensitive drum 14. In the non-erasable MFP 3, the developing device 18 supplies non-erasable toner to the electrostatic latent image on the photosensitive drum 14 using non-erasable two-component developer which is a mixture of non-erasable toner which does not fade out by heating, and a magnetic carrier. In the erasable MFP 4, the developing device 18 supplies erasable toner to the electrostatic latent image on the photosensitive drum 14 using erasable two-component developer which is a mixture of erasable toner (which is erased by heating), and the magnetic carrier.

The erasable toner, for example, contains colorant, color compound and color developer in the binder resin. When the erasable toner is heated up to a temperature equal to or higher than the erasing temperature, the color compound and the color developer are dissociated, and the erasable toner is erased. For example, the erasable toner can be fixed on the sheet at comparatively low temperature and erased at a temperature higher than the fixing temperature by approximately 10° C. When a fixed toner image formed using the erasable toner is heated up to the temperature higher than the fading temperature, the color compound and the color developer in the erasable toner are dissociated and the toner image is erased.

The transfer device 20 transfers the non-erasable toner image or the erasable toner image formed on the photosensitive drum 14 to the sheet P.

The sheet feeder 13 includes a sheet feeding cassette 13a and a sheet feeding roller 15, and feeds the sheet P in the direction to image forming station 11. The sheet feeding cassette 13a stores the sheet P. The sheet P may be any one of an unused sheet or a reused sheet, i.e., the sheet on which the color has been erased by the erasing process.

The transportation unit 23 includes a transportation roller 23a, a registration roller 23b and a sheet discharge roller 23c. The transportation unit 23 transports the sheet P from the sheet feeder 13 to the sheet discharge unit 22 via the image forming station 11.

The fixing device 24 fixes the toner image formed on the sheet P in the image forming station 11. The non-erasable MFP 3 or the erasable MFP 4 sets the fixing temperature of the fixing device 24 according to characteristics of each of the toners. For example, in the erasable MFP 4, the fixing temperature of the fixing device 24 is set to be lower than the erasing temperature of the erasable toner.

The printers 3a and 4a are not limited by the above description and may be a color printer and an inkjet type printer.

Figure 3:
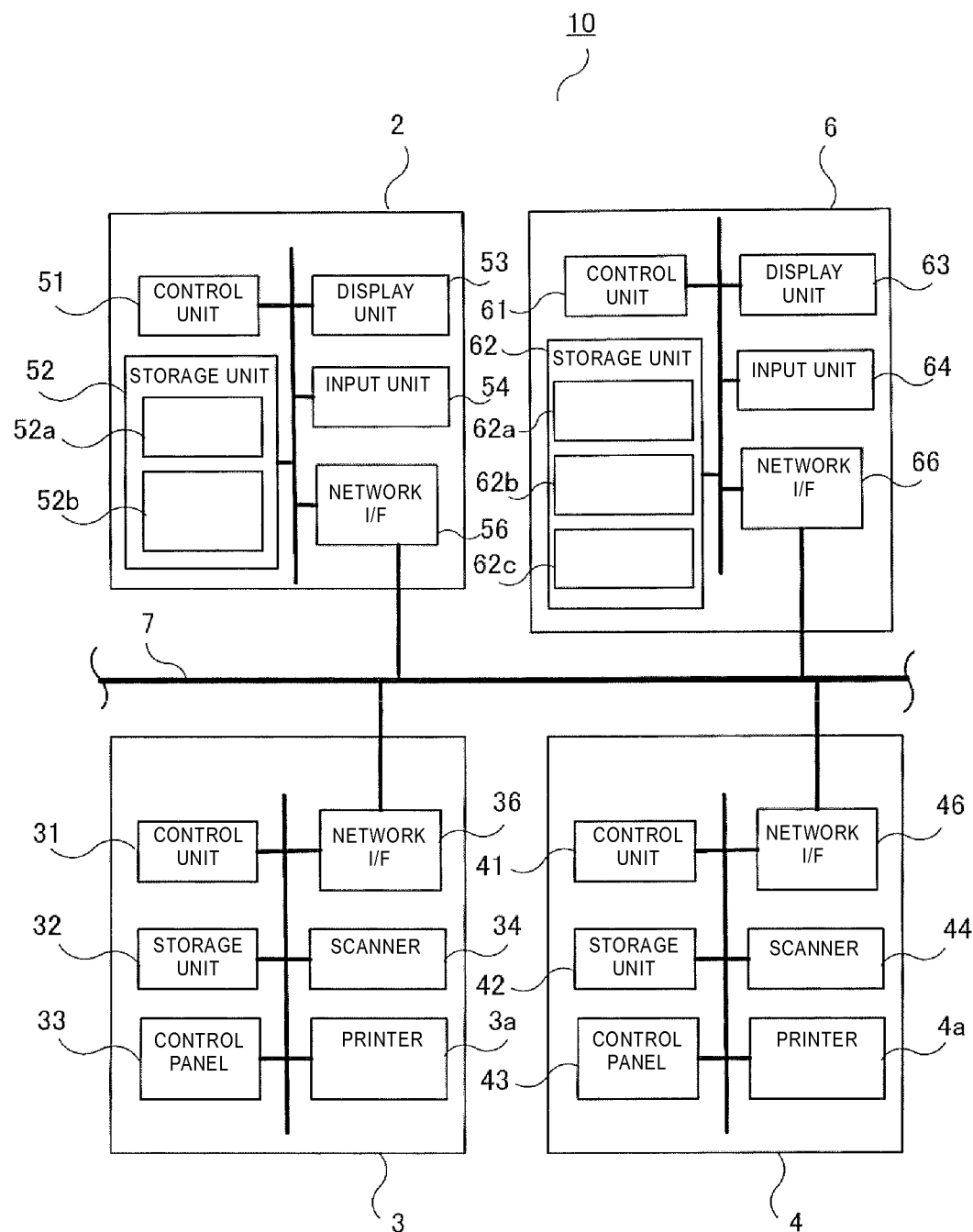
FIG. 3 illustrates a hardware configuration of the image forming system, according to the first embodiment.

A hardware configuration of the image forming system 10 will be described with reference to the block diagram illustrated in FIG. 3.

The PC 2 includes, for example, a control unit 51, a storage unit 52 that includes an accumulation section 52a and a document registration section 52b, a display unit 53, an input unit 54 and a network interface (I/F) 56. The control unit 51 controls the entire PC 2. The control unit 51 executes programs stored in the accumulation section 52a and the document registration section 52b to realize various processing functions.

The accumulation section 52a stores a control program and control data that administer a basic operation of the PC 2, as well as application software and a printer driver for a document creation and a table calculation and the like. The document registration section 52b stores a document registration application that registers the created document data to the server 6. The display unit 53 displays, for example, print data created by the user, operational screens for various applications, various information for the user, and the like. The input unit 54 accepts input of the user's operations and instructions. The network I/F 56 performs data communications with the external devices connected to the LAN 7.

The non-erasable MFP 3 includes, for example, a control unit 31, a storage unit 32, a control panel 33, a printer 3a that prints using the non-erasable coloring material, a scanner 34 and a network I/F 36. The control unit 31 controls the entire non-erasable MFP 3. The control unit 31 executes the program stored in the storage unit 32 to realize various processes to print.

The storage unit 32 stores, for example, a control program for the non-erasable MFP 3 and print data for the non-erasable printing. The storage unit 32 includes a storage region that expands and processes the print data. The control panel 33 receives input from the user, and displays information to the user. The control panel 33 includes, for example, various operation buttons that accept input of operations by the user and a display section with a built-in touch panel which displays information to the user and receives input from the user.

The scanner 34 reads a document image to perform the non-erasable printing. The network I/F 36 performs data communication with the external devices connected to the LAN 7.

The erasable MFP 4 includes, for example, a control unit 41, a storage unit 42, a control panel 43, a printer 4a that prints using the erasable coloring material, a scanner 44 and a network I/F 46. The control unit 41 controls the entire erasable MFP 4. The control unit 41 executes the program stored in the storage unit 42 to realize various processes to print.

The storage unit 42 stores, for example, a control program for the erasable MFP 4 and print data for the erasable printing. The storage unit 42 includes a storage region that expands and processes the print data. The control panel 43 receives input from the user, and displays information to the user. The control panel 43 includes, for example, various operation buttons that accept input of operations by the user and a touch panel embedded display section which displays information to the user and receives input from the user.

The scanner 44 reads a document image to perform the erasable printing. The network I/F 46 performs data communication with the external devices connected to the LAN 7.

The server 6 includes, for example, a control unit 61, a storage unit 62, a display unit 63, an input unit 64 and a network I/F 66. The control unit 61 controls the entire server 6. The control unit 61 performs the overall administration of the image forming system 10 based on various data stored in the storage unit 62.

The storage unit 62 includes, for example, a document storage section 62a to save document data, a table storage section 62b acting as a property registration section and configured to save a table of property information of the document data, and a printing policy storage section 62c to save a printing policy which is a determination condition. The document storage section 62a may store the document data having the print data and the property information. Alternatively, the document storage section 62a may store only the print data linked to the property information stored in the table storage section 62b.

The document storage section 62a or the table storage section 62b saves the document data or the property information respectively, when the PC 2 instructs the document registration, for example. The document storage section 62a or the table storage section 62b is updated, for example when the PC 2 instructs the document registration each time the PC 2 transmits the document data. The printing policy storage section 62c stores the printing policy set by an administrator who administrates the image forming system 10. The printing policy storage section 62c is rewritten according to the policy of the administrator.

The display unit 63 displays, for example, various information to the administrator of the image forming system 10. The input unit 64 accepts input of the administrator's operations and instructions. The network I/F 66 performs data communication with the external devices connected to the LAN 7.

The configuration of the server is not limited to the above description. The document data may be stored by providing a large-capacity memory for data storage such as a HDD. By providing a plurality of servers, data administration and system administration may be realized by other servers.

Figure 4:
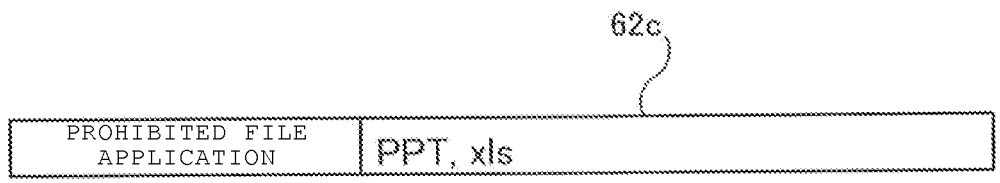
FIG. 4 illustrates storage contents of a printing policy storage section in the first printing policy, according to the first embodiment.

The image forming system 10, for example, sets a first printing policy as follows: "If the print data is neither a PPT file nor an XLS file, print all the documents with the erasable MFP 4". The first printing policy of the image forming system 10 is set by the administrator in advance. As illustrated in FIG. 4, the administrator saves the PPT file and the XLS (Excel) file as a prohibited file application name to the printing policy storage section 62c as the first printing policy.

For example, if the print data formed in the PC 2 is a PPT file or an XLS file, the server 6 controls such that the print data is printed by the non-erasable MFP 3. Likewise, if the print data formed in the PC 2 is other than a PPT file or an XLS file, the server 6 controls such that the print data is printed by the erasable MFP 4.

The printing process by the image forming system 10 that includes the first printing policy will be described with reference to FIG. 5 through FIG. 7. The image forming system 10 performs the printing process according to the printing policy of the server 6.

Figure 5:
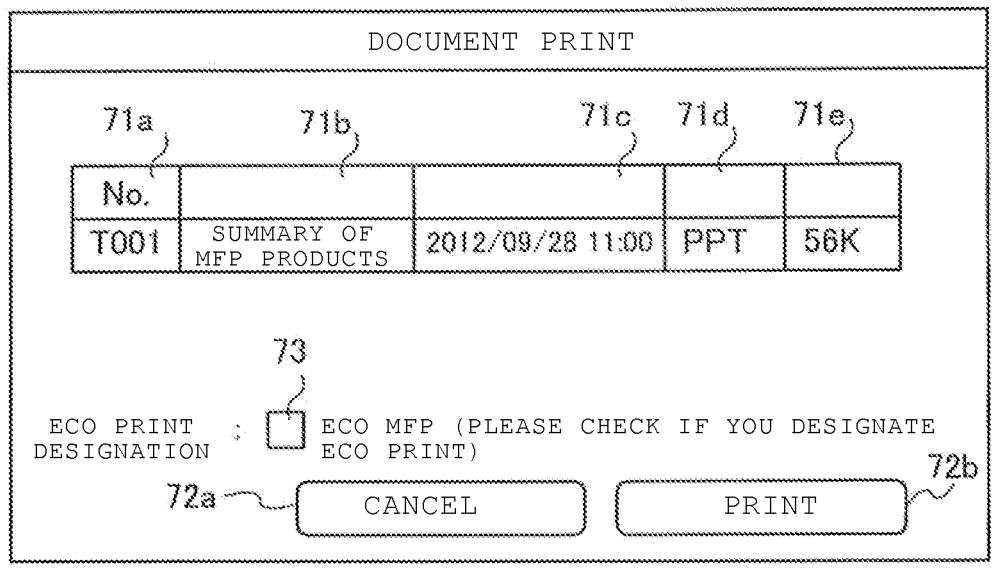
FIG. 5 illustrates a printer driver screen on a PC, according to the first embodiment.
Figure 6:
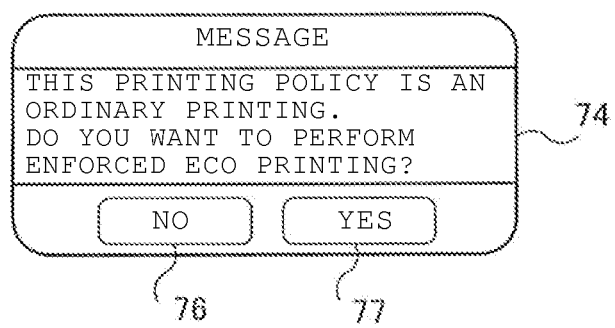
FIG. 6 illustrates an enforced Eco print message from a server, according to the first embodiment.

For example, the user who requests to print creates the print data using the predetermined application software on the PC 2 and instructs the server 6 to print, through a printer driver screen 70 illustrated in FIG. 5.

The printer driver screen 70 displays a property information 71 of the created print data. For example, the property information 71 includes a document number 71a, a document name 71b, a registration date 71c, a file application name 71d and a file size 71e. The printer driver screen 70 includes a "CANCEL" button 72a, a "PRINT" button 72b, and a check box 73 for Eco print designation, which acts as an enforcing section. If the user presses the "PRINT" button 72b, the server 6 starts the printing process according to the printing policy of the image forming system 10.

In a case of the enforced Eco printing by the user's checking of the check box 73, the server 6 confirms from the user whether or not to perform the enforced Eco printing. When the user's checking of the check box 73 is different from the printing policy of the image forming system 10, the server 6 determines the printing as the enforced Eco printing. When the enforced Eco printing is determined, the server 6 transmits an enforced Eco print message 74 to the PC 2, as illustrated in FIG. 6.

For example, when the document data is to be printed by the non-erasable MFP 3 according to the printing policy of the image forming system 10, when the check box 73 is checked by the user, the server 6 transmits the enforced Eco print message 74 to the PC 2. The user presses "No" button 76 when the user agrees with the printing policy of the image forming system 10, in order to instruct the printing by the non-erasable MFP 3. The user presses "YES" button 77 when the user does not agree with printing policy of the image forming system 10, in order to instruct the printing by the erasable MFP 4.

Figures 7, 8:
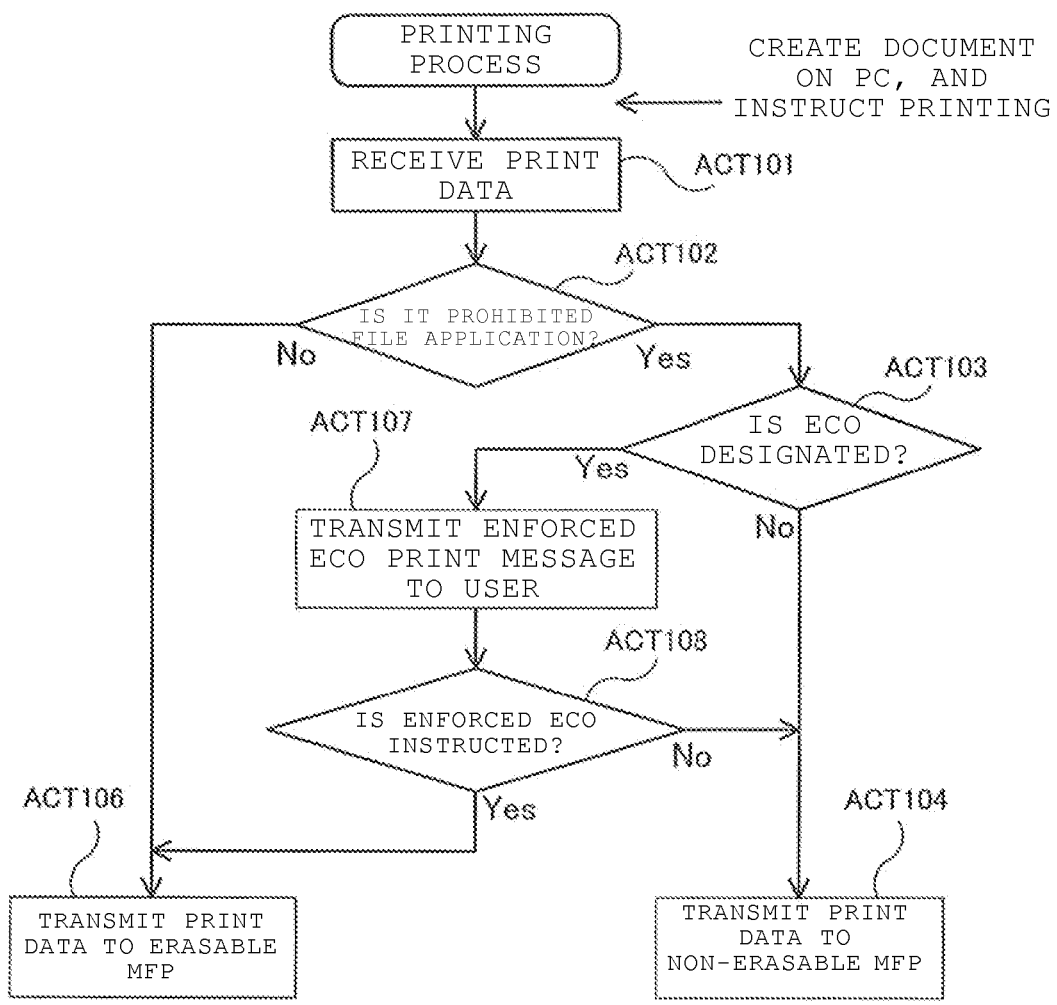
FIG. 7 is a flow chart illustrating a printing process in the first printing policy, according to the first embodiment.
FIG. 8 illustrates storage contents of a printing policy storage section in the second printing policy, according to the first embodiment.

The printing process is illustrated in the flow chart in FIG. 7. The user starts the printing process by pressing the "PRINT" button 72b on the printer driver screen 70 of the PC 2. The use also presses the "NO" button 76 or the "YES" button 77 of the enforced Eco print message 74. By starting the printing process, the control unit 61 of the server 6 receives the print data from the PC 2 (ACT101).

In ACT102, the control unit 61 of the server 6 determines whether the file application of the received print data is one of the prohibited file applications stored in the printing policy storage section 62c. For example, if the print data is a PPT file or an XLS file (Yes in ACT102), the control unit 61 of the server 6 proceeds to ACT 103. When the check box 73 is not checked so that the Eco is not designated (No in ACT103), the control unit 61 of the server 6 transmits the print data to the non-erasable MFP 3 (ACT104). The non-erasable MFP 3 prints the print data received from the server 6 on the sheet P in the non-erasable mode in which the non-erasable toner is used.

In ACT102, when the file application of the received print data is other than the prohibited file application stored in the printing policy storage section 62c (No in ACT102), the control unit 61 of the server 6 proceeds to ACT 106. In ACT 106, the control unit 61 of the server 6 transmits the print data to the erasable MFP 4. The server 6 performs the printing by the erasable MFP 4 according to the printing policy set by the administrator. The erasable MFP 4 prints the print data received from the server 6 on the sheet P in the erasable mode in which the erasable toner is used.

In the printer driver screen 70, when the check box 73 is checked so that the Eco is designated (Yes in ACT103), the control unit 61 of the server 6 transmits the enforced Eco print message 74 to the PC 2 (ACT107), and proceeds to ACT108. In the PC 2, when the "NO" button 76 of the enforced Eco print message 74 is pressed (No in ACT108), the control unit 61 of the server 6 proceeds to ACT 104. The non-erasable MFP 3 prints the print data on the sheet P in the non-erasable mode in which the non-erasable toner is used.

When the "YES" button 77 of the enforced Eco print message 74 is pressed (Yes in ACT108), the control unit 61 of the server 6 proceeds to ACT 106. The control unit 61 of the server 6 performs the printing by the erasable MFP 4 regardless of the printing policy set by the administrator. The erasable MFP 4 prints the print data on the sheet P using the erasable toner.

The administrator of the image forming system 10 can change the printing policy of the image forming system 10. For example, in order to change the printing policy, the administrator rewrites the stored contents in the printing policy storage section 62c. For example, the administrator may store confidentiality keywords instead of the prohibited file application name in the printing policy storage section 62c. For example, as illustrated in FIG. 8, the administrator saves "secret", "confidential", "internal use only" and "duplication prohibited" as confidentiality keywords in the printing policy storage section 62c in advance.

The image forming system 10 sets a second printing policy saying that, for example, "If the print data does not include the confidentiality keyword, then print all the document data by the erasable MFP 4".

If the image forming system 10 includes the second printing policy, when the print data formed in the PC 2 includes the confidentiality keyword, the server 6 controls so as to print the print data by the non-erasable MFP 3, for example. If the print data formed in the PC 2 does not include the confidentiality keyword, for example, the server 6 controls so as to print the print data by the erasable MFP 4.

Figure 9:
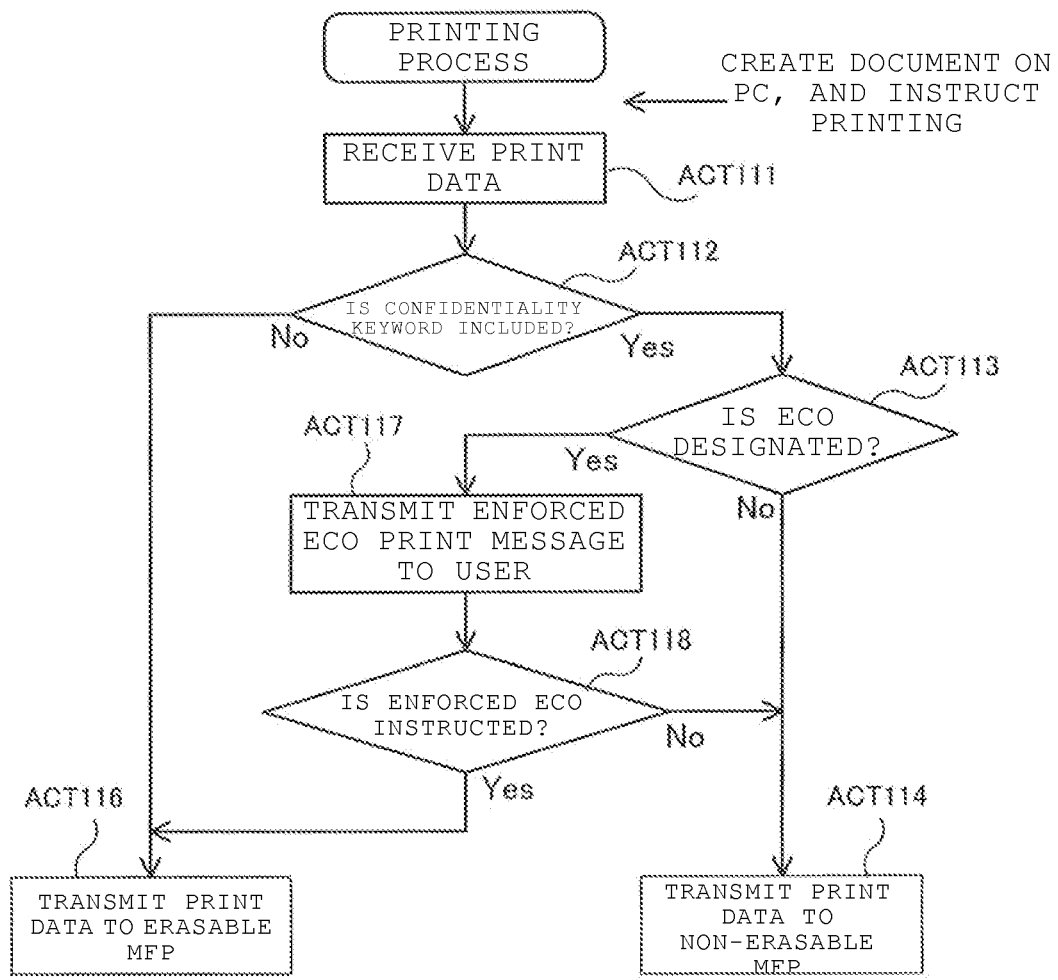
FIG. 9 is a flow chart illustrating a printing process in the second printing policy, according to the first embodiment.

The printing process by the image forming system 10 which includes the second printing policy is illustrated in the flow chart in FIG. 9. The control unit 61 of the server 6 receives the print data from the PC 2 similar to the case of the first printing policy (ACT111).

The control unit 61 of the server 6 determines whether the received print data includes one of the confidentiality keywords stored in the printing policy storage section 62c in ACT112. When the print data includes one of the confidentiality keywords (Yes in ACT112), the control unit 61 of the server 6 proceeds to ACT113. When the check box 73 is not checked (No in ACT113), the control unit 61 of the server 6 transmits the print data to the non-erasable MFP 3 (ACT114). The non-erasable MFP 3 prints the print data received from the server 6 on the sheet P using the non-erasable toner.

In ACT112, when the received print data does not include one of the confidentiality keywords (No in ACT112), the control unit 61 of the server 6 proceeds to ACT116. In ACT116, the control unit 61 of the server 6 transmits the print data to the erasable MFP 4. The erasable MFP 4 prints the print data received from the server 6 on the sheet P using the erasable toner.

In the printer driver screen 70, when the check box 73 is checked (Yes in ACT113), the control unit 61 of the server 6 transmits the enforced Eco print message 74 to the PC 2 (ACT117), and proceeds to ACT118. In the PC 2, when the "NO" button 76 of the enforced Eco print message 74 is pressed (No in ACT118), the control unit 61 of the server 6 proceeds to ACT 114. The non-erasable MFP 3 prints the print data on the sheet P using the non-erasable toner.

In the PC 2, when the "YES" button 77 of the enforced Eco print message 74 is pressed (Yes in ACT118), the control unit 61 of the server 6 proceeds to ACT 116. The control unit 61 of the server 6 performs the printing by the erasable MFP 4 regardless of the printing policy set by the administrator. The erasable MFP 4 prints the print data on the sheet P using the erasable toner.

According to the first embodiment, the administrator stores the printing policy in the printing policy storage section 62c of the server 6 to set the printing policy of the image forming system 10. When the user transmits the print data to the server 6, the server 6 selects either the non-erasable MFP 3 or the erasable MFP 4 according to the printing policy of the image forming system 10 and according to the user selection from the enforced Eco print message 74. The non-erasable MFP 3 or the erasable MFP 4 prints the print data received from the server 6.

According to the first embodiment, when the user instructs the printing, the user does not need to select either the non-erasable MFP 3 or the erasable MFP 4. The print data is automatically printed by the non-erasable MFP 3 or the erasable MFP 4 according to the printing policy of the image forming system 10. The printing policy of the image forming system 10 can be easily changed by the administrator of the image forming system 10 by only rewriting the printing policy stored in the printing policy storage section 62c.

According to the first embodiment, the image forming system 10 does not rely on the determination of the user in setting the printing mode of the print data required to be printed. The determination of the printing mode is performed according to the printing policy to be set in the server 6. The printing in the erasable mode can be automatically promoted according to the printing policy which is set in the server 6 by the administrator. By promoting the printing in the erasable mode according to the printing policy which is set in the server 6 by the administrator, the percentage of reusing the sheets P can be increased. Therefore, it is possible to save the consumables and to contribute to environmental preservation. The printing policy can be easily changed by changing the setting of the printing policy by the administrator of the image forming system 10. Therefore, the saving of the consumables and the environmental preservation can be obtained, according to the requirements of the administrator.

(Second Embodiment)

An image forming system according to a second embodiment will be described with reference to FIG. 10 to FIG. 17. The image forming system in the second embodiment further includes a document registration function in addition to the features described above with respect to the first embodiment. In the second embodiment, the configuration similar to that described in the first embodiment will be referenced by the similar reference numerals and detailed descriptions will not be repeated.

The server 6 performs an administration of the image forming system 10. The administration includes registering a document to the document storage section 62a and the table storage section 62b. For example, when the PC 2 instructs the document registration by the document registration application, the server 6 saves the document data in the document storage section 62a and creates a list that includes the property information of the document data. The list is stored in the table storage section 62b. The document storage section 62a and the table storage section 62b, for example, are updated whenever the PC is instructed to perform the document registration by the document registration application.

The administrator of the image forming system 10 saves the printing policy in the printing policy storage section 62c of the server 6. The printing policy saves the prohibited items to be compared with the document registration list which is registered in the table storage section 62b. The administrator, for example, saves printing policy items 80 illustrated in FIG. 10 in the printing policy storage section 62c.

The printing policy items 80 includes a document distribution destination 80a, a document type 80b, a frequency of confidentiality keywords 80c and a file application 80d as the prohibition items. For example, he list of confidentiality keywords—from which the frequency of confidentiality keywords 80c is determined—are "secret", "confidential", "internal use only" and "duplication prohibited" as illustrated in FIG. 8.

As an example, the printing policy items 80 may include any one of the following:
  the document distribution destination 80a is "external";
  the document type 80b is "materials for management conference", "design materials", "sales data" or "personal information";
  the frequency of confidentiality keywords 80c is "a page having two/page or more is present"; or
  the file application 80d is "PPT",
If the server 6 determines that the document information includes one of the printing policy items 80 (i.e., one of items 80*a* through 80*d*), the server 6 administrates the image forming system 10 so as to print the print data by the non-erasable MFP 3.

The printing policy items 80 in the printing policy storage section 62*c* can be rewritten according to the policy of the administrator.

The document registration process of the image forming system 10 by the server 6 will be described with reference to FIG. 11 to FIG. 14. For example, when the document registration is required after the print data is created, the user instructs the server 6 by the PC 2 to perform the document registration through the document registration screen 90 of the document registration application illustrated in FIG. 11.

The document registration screen 90, for example, includes registration items of the created print data such as a document name input field 91, a document distribution destination selection field 92, a document type selection field 93, a "CANCEL" button 94*a* and a "REGISTER" button 94*b*. When the user fills in the document name and selects the document distribution destination and the document type and presses the "REGISTER" button 94*b*, the server 6 saves the document data in the document storage section 62*a*, and saves the property information of the document data in the table storage section 62*b*.

Figure 13:
FIG. 13 illustrates an example number assignment message, according to the second embodiment.

The server 6 assigns the numbering of the document data required for document registration and sequentially saves the property information in a "document registration list" 95 of the table storage section 62*b* illustrated in FIG. 12. The "document registration list" 95 includes a number assignment 96, the property information 97 and the print record 98. The property information 97 includes a document name 97*a*, a file application 97*b*, a document distribution destination 97*c*, a document type 97*d*, number of pages 97*e*, registrant code 97*f* and a frequency of confidentiality keywords (average/page). When the registered document data is printed, the print record 98, for example, records a user code, print date and the print mode (the non-erasable mode or the erasable mode) as print history information. The print record 98 may be administered as log-in information, separate from the property information 97. When the document is registered, the server 6 transmits a number assignment message to the PC 2 and the number assignment message screen 120 illustrated in FIG. 13 is displayed on the display unit 53 of the PC 2.

Figure 14:
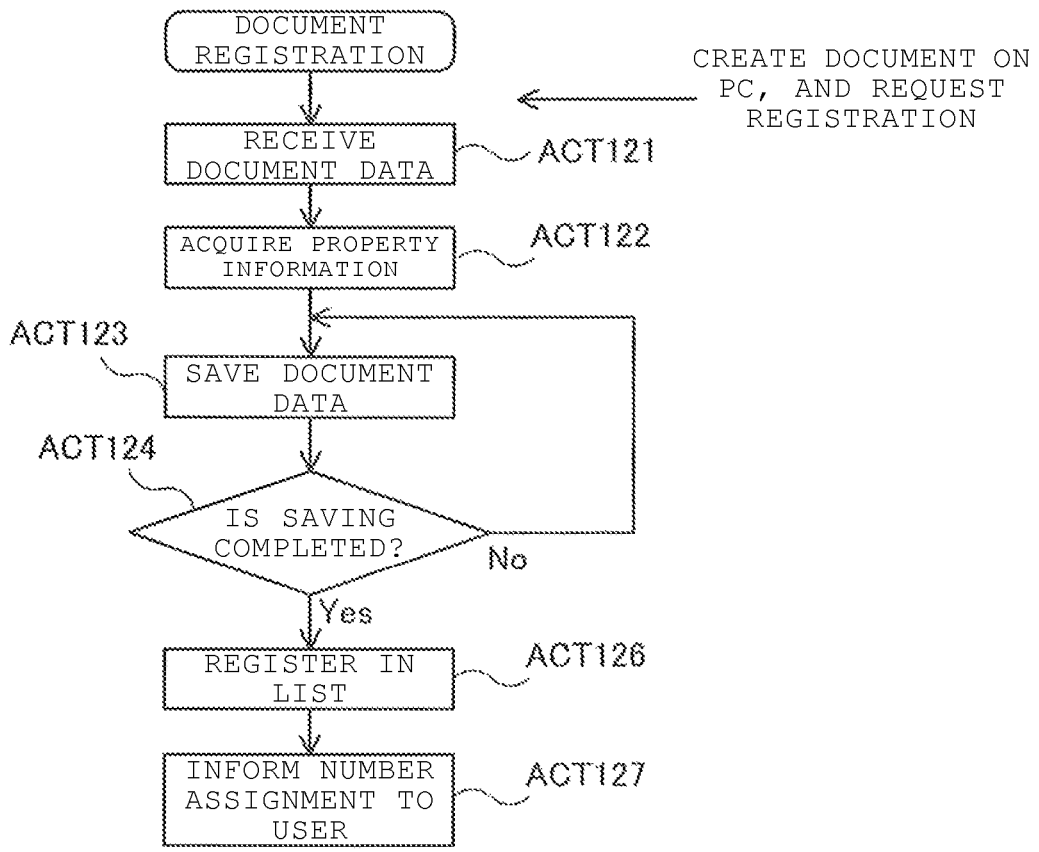
FIG. 14 is a flow chart illustrating a document registration process, according to the second embodiment.

The document registration process is illustrated in a flow chart in FIG. 14. The user fills in the document name on the document registration screen 90 of the PC 2, and requests the document registration process from the server 6 by pressing the "REGISTER" button 94*b* after selecting the document distribution destination and the document type. Based on the request for the document registration process from the PC 2, the control unit 61 of the server 6 receives the document data from the PC 2 (ACT121), and acquires the property information 97. The control unit 61 of the server 6 saves the document data in the document storage section 62*a* (ACT123). When the document data is saved (Yes in ACT124), the control unit 61 of the server 6 performs the number assignment for the saved document data and registers the property information in the "document registration list" 95 (ACT126). The control unit 61 of the server 6 informs the PC 2 of the number assignment of the registered document data (ACT127).

The printing process of the document data registered in the server 6 will be described with reference to FIG. 15 and FIG. 16. The user requests printing of the document data and instructs the server 6 to print, through the printer driver screen 130 illustrated in FIG. 15.

The printer driver screen 130, for example, displays a registered document summary 131 of the registered document data. The registered document summary 131 includes a document number 131*a*, a document name 131*b*, a registration date 131*c*, a file type 131*d* and a file size 131*e*. The printer driver screen 130 includes a "CANCEL" button 132*a*, a "PRINT" button 132*b*, and a check box for the Eco print designation 133.

Figure 16:
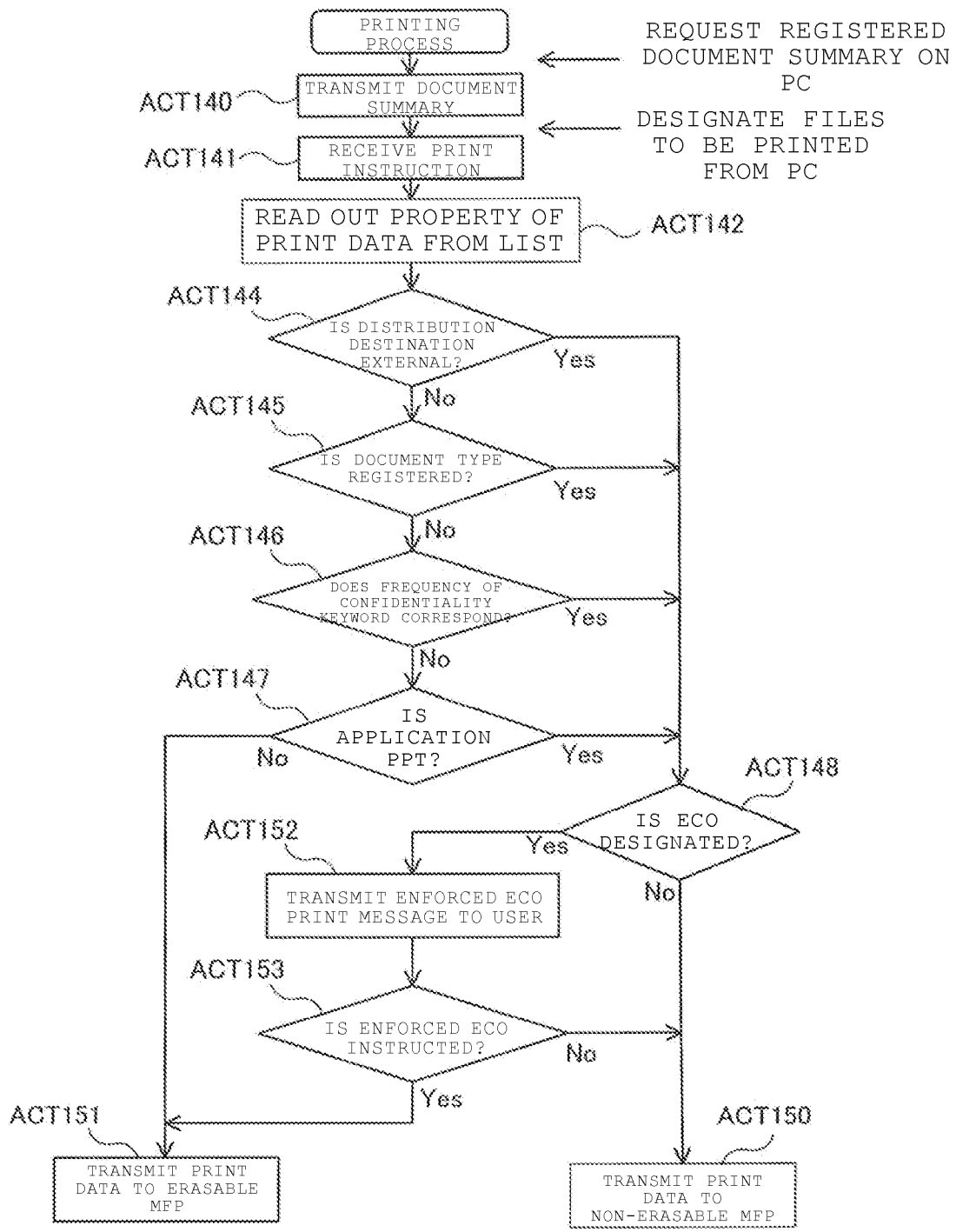
FIG. 16 is a flow chart illustrating a printing process of print data which is registered, according to the second embodiment.

The printing process of the registered print data is illustrated in a flow chart in FIG. 16. When the user requests the document registration list to the server 6 through the list request screen (not illustrated) of the PC 2, the control unit 61 of the server 6 transmits the registered document summary 131 to the PC 2 (ACT140). The PC 2 receives the transmission of the registered document summary 131 from the server 6, and displays the printer driver screen 130 illustrated in FIG. 15. When the user selects one of the registered documents to be printed through the printer driver screen 130 and presses the "PRINT" button 132*b*, the control unit 61 of the server 6 receives the print instruction from the PC 2 (ACT141), and starts the printing process according to the printing policy.

In case of the enforced Eco printing, i.e., when the user has checked the check box 133, the server 6 confirms from the user whether or not to perform the enforced Eco printing. The confirmation is performed using the enforced Eco print message 74 illustrated in FIG. 6, similar to the case described above with respect to the first embodiment.

Figure 10:
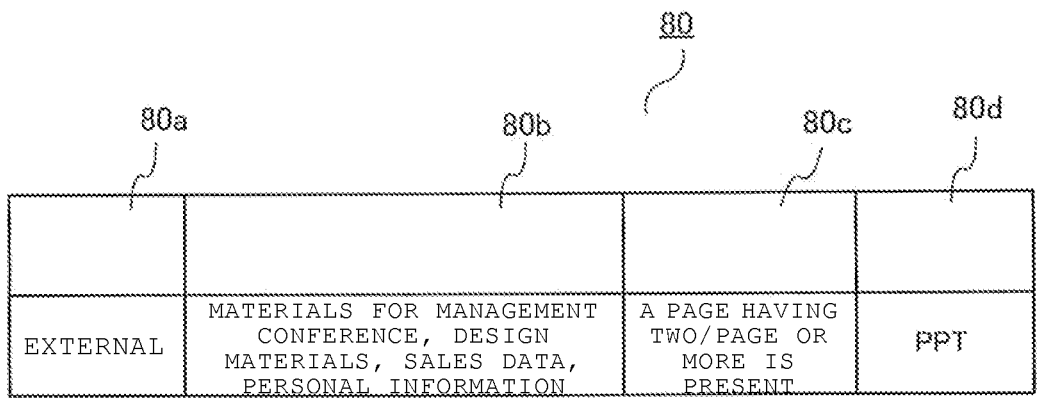
FIG. 10 illustrates an example printing policy, according to a second embodiment.
Figure 11:
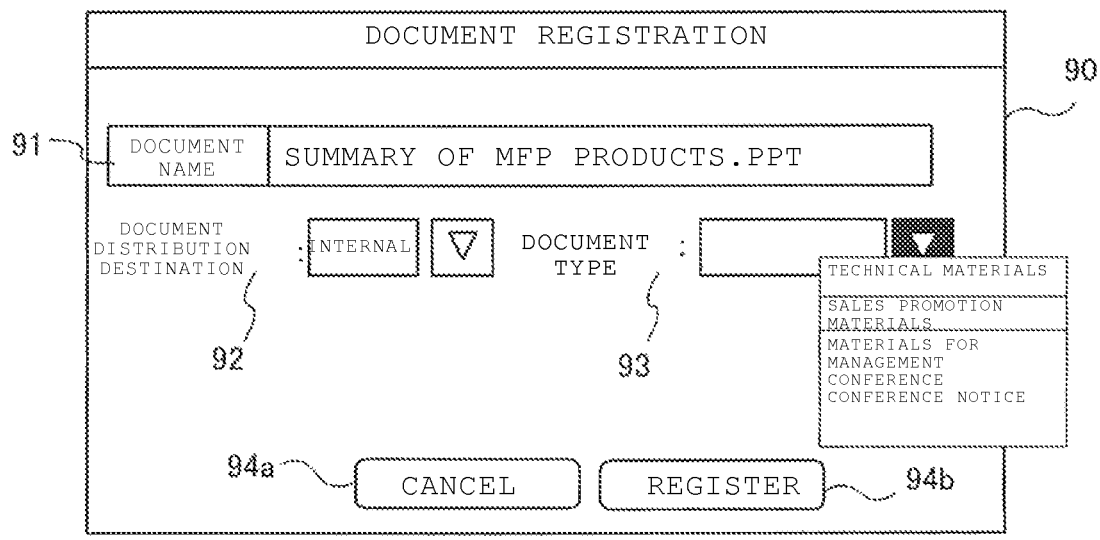
FIG. 11 illustrates an example document registration screen on a PC, according to the second embodiment.

The control unit 61 of the server 6 reads out the property information 97 of the document number which is instructed to be printed from the "document registration list" 95 (ACT142), and determines whether or not the one or more of the items in the property information 97 corresponds to the printing policy items 80 in FIG. 10 stored in the printing policy storage section 62*c*. Specifically, the control unit 61 of the server 6 proceeds to ACT148 when the distribution destination is "external" (Yes in ACT144). When the distribution destination is internal (No in ACT144), the control unit 61 of the server 6 determines whether or not the document type is included in the printing policy items 80 in ACT145. If the document type is included in the printing policy (Yes in ACT145), the control unit 61 of the server 6 proceeds to ACT148.

If the document type is not included in the printing policy items 80 (No in ACT145), the control unit 61 of the server 6 determines whether or not the frequency of the confidentiality keywords corresponds to the printing policy items 80 in ACT146. If the frequency of the confidentiality keywords corresponds to the printing policy items 80 (Yes in ACT146), the control unit 61 of the server 6 proceeds to ACT148.

If the frequency of the confidentiality keywords does not correspond to the printing policy items 80 (No in ACT146), the control unit 61 of the server 6 determines whether the file application is "PPT" or not in ACT147. If the file application is "PPT" (Yes in ACT147), the control unit 61 of the server 6 proceeds to ACT148.

In ACT148, if check box 133 is not checked (No in ACT148), control unit 61 of the server 6 transmits the print data to the non-erasable MFP 3 (ACT150). The non-erasable MFP 3 prints the print data received from the server 6 on the sheet P in the non-erasable mode in which non-erasable toner is used.

In ACT147, if the file application is other than "PPT" (No in ACT147), the control unit 61 of the server 6 proceeds to ACT151. In ACT148, if check box 133 is checked (Yes in ACT148), control unit 61 of the server 6 transmits the enforced Eco print message 74 illustrated in FIG. 6 to the PC 2 (ACT152) and proceeds to ACT153. In the PC 2, if the "NO" button 76 on the enforced Eco print message 74 is pressed (No in ACT153), the control unit 61 of the server 6 proceeds to ACT150. The non-erasable MFP 3 prints the print data on the sheet P in the non-erasable mode in which the non-erasable toner is used.

In the PC 2, when the "YES" button 77 of the enforced Eco print message 74 is pressed (Yes in ACT153), the control unit 61 of the server 6 proceeds to ACT151. In ACT151, the control unit 61 of the server 6 transmits the print data to the erasable MFP 4. The erasable MFP 4 prints the print data received from the server 6 on the sheet P in the erasable mode in which erasable toner is used.

After finishing the printing process, the control unit 61 of the server 6, for example, records the user code, the print date, and the printing mode used, i.e., whether printing was performed in the non-erasable mode or the erasable mode. The recorded information is stored on the print record 98 of the "document registration list" 95.

Figure 17:
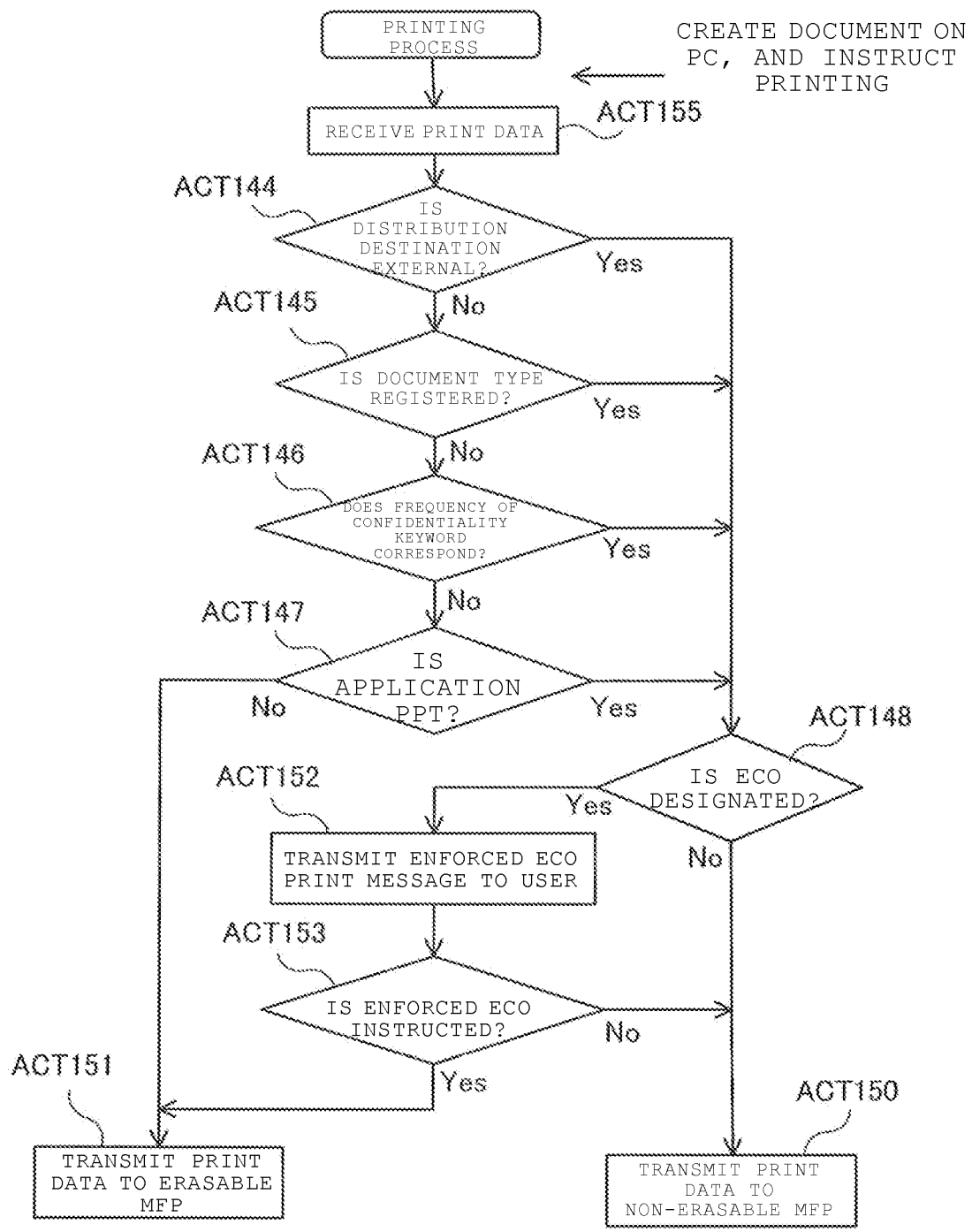
FIG. 17 is a flow chart illustrating a printing process of printing data which is not registered, according to the second embodiment.

A flow chart detailing a printing process which does not require the document registration is illustrated in FIG. 17. The user sets the printing on the printer driver screen 70 illustrated in FIG. 5 in the first embodiment after the document creation and when the Eco printing is designated. The user starts the printing process by operating the enforced Eco print message 74 in FIG. 6. By starting the printing process, the control unit 61 of the server 6 receives the print data from the PC 2 (ACT155). Then, the control unit 61 of the server 6 performs the printing process according to the flow chart subsequent to ACT144 in FIG. 16 in which the determination is made of whether the property information 71 of the print data corresponds to the registration in the printing policy items 80 in FIG. 10 or not.

According to the second embodiment, the image forming system 10 includes the document registration function which saves the document data in the document storage section 62*a* and saves the property information 97 in the "document registration list" 95 in the table storage section 62*b*. The administrator saves the printing policy items 80 as a determination condition in the printing policy storage section 62*c* of the server 6 and thereby sets the printing policy of the image forming system 10. When the user instructs printing of the registered document data, the server 6 compares the property information 97 in the "document registration list" 95 to the printing policy items 80 and selects either the non-erasable MFP 3 or the erasable MFP 4. The server 6 transmits the print data to the non-erasable MFP 3 or the erasable MFP 4 based on the selection result and performs printing. The user can set the enforced Eco printing from the enforced Eco print message 74 similarly to the first embodiment. Similarly, when printing print data which does not require document registration, the server 6 compares the property information 71 of the print data to the printing policy items 80 and selects either the non-erasable MFP 3 or the erasable MFP 4.

According to the second embodiment, the image forming system 10 does not rely on the user in setting the printing mode of the print data required to be printed, similar to the first embodiment. For any document data which is registered or for any print data which is not required to be registered, the server 6 determines the printing mode according to the printing policy items 80. The printing policy items 80 set in the server 6 by the administrator, and printing in the erasable mode can be automatically promoted. By promoting the printing in the erasable mode according to the printing policy items 80 set by the administrator, the percentage of reusing the sheets P can be increased. Therefore, it is possible to save the consumables and to contribute to environmental preservation. The printing policy of the image forming system 10 can be easily changed by rewriting the printing policy items 80 by the administrator of the image forming system 10.

Therefore, according to the second embodiment, the saving of the consumables and the environmental preservation can be obtained according to the requirements of the administrator.

(Third Embodiment)

The image forming system in the third embodiment will be described with reference to FIG. 18. In the third embodiment, the image forming system as described in the second embodiment further includes a printing policy with a plurality of levels stored in advance. In the third embodiment, the printing policy desired by the administrator is set from the plurality of printing policies. In the third embodiment, the configuration similar to that described in the second embodiment will be referenced by similar reference numerals and detailed descriptions will not be repeated.

The printing policy storage section 62*c*, for example, includes the printing policy items 150 illustrated in FIG. 18. The printing policy items 150 include three printing policies having different levels respectively: a printing policy 1, a printing policy 2 and a printing policy 3. The printing policy items 150 include a document distribution destination 150*a*, a document type 150*b*, a frequency of the confidentiality keywords 150*c* and a file application 150*d* as the prohibition items. The confidentiality keywords 150*c*—from which the frequency of confidentiality keywords is determined—are "secret", "confidential", "internal use only" and "duplication prohibited" as illustrated in FIG. 8.

Each printing policy 1, 2 and 3 has different items to be set in the prohibition items. The printing policy 1 has the most number of determination items in the prohibition items, and is followed by the printing policy 2 and the printing policy 3 (in that order). The printing policy 3 has the least number of determination items in the prohibition items.

During the setting up of the image forming system 10, when the administrator sets the printing policy 1 of the printing policy items 150, the percentage of printing in the non-erasable mode by the non-erasable MFP 3 is increased. In case of the printing policy 1 in the image forming system 10, the printing in the erasable mode is decreased. Therefore, the environmental contribution by saving resources is decreased.

During the setting up of the image forming system 10, when the administrator sets the printing policy 2 and the printing policy 3 of the printing policy items 150, the percentage of printing in the non-erasable mode by the non-erasable MFP 3 is decreased sequentially. In cases of the printing policy 2 and the printing policy 3 in the image forming system. 10, the printing in the erasable mode is increased sequentially. Therefore, the environmental contribution by saving resources is increased.

During the setting up of the image forming system 10, the administrator of the image forming system 10, for example, sets any of the printing policy 1, the printing policy 2 or the printing policy 3 according to the security level required by the administrator.

When the security level required by the administrator is high, the administrator sets the printing policy 1 as the printing policy of the image forming system 10. In accordance with the decrease of the security level required by the administrator, the administrator sets the printing policy 2 or the printing policy 3 as the printing policy of the image forming system 10.

The administrator can change the level of the printing policy by operating the printing policy storage section 62*c*. The administrator sets the printing policy 3 as the printing policy of the image forming system 10, for example, when the administrator wants to give priority to increasing the environmental contribution. The administrator sets the printing policy 1 as the printing policy of the image forming system 10, for example, when the administrator wants to give priority to increasing the security.

In the third embodiment, when there is a request for printing from the user, the printing process is performed using the printing policy level set by the administrator. The flow chart for the printing process in the third embodiment is the same as the flow chart in the second embodiment illustrated in FIG. 16 or FIG. 17 except the different determination criteria in ACT144 to ACT147. In the third embodiment, the determination criteria in ACT144 to ACT147 are different depending on which of the printing policy 1, the printing policy 2 or the printing policy 3 is set as the printing policy of the image forming system 10. Moreover, the number of levels of the printing policy is flexible and many levels may be included according to the applications, and the prohibition items also may not be limited. Furthermore, in setting the printing policy level, the criteria may be set from the perspective of the printing cost rather than the security level.

According to the third embodiment, the image forming system 10 includes the printing policy 1, the printing policy 2 and printing policy 3 having different levels, in the table storage section 62b. During the setting up of the image forming system 10, the administrator selects and sets the required printing policy from the plurality of printing policies in the table storage section 62b.

According to the third embodiment, similar to the second embodiment, the image forming system 10 does not rely on the user's determination in setting the printing mode of document data required to be printed. In the image forming system 10, the server 6 determines the printing mode according to the printing policy level set by the administrator from the printing policy items 150. According to the printing policy with the level set in the server 6 by the administrator, the printing in the erasable mode can be automatically promoted. By promoting the printing in the erasable mode according to the printing policy with the level set by the administrator, the percentage of reusing the sheets P can be increased. Therefore, it is possible to save consumables and to contribute to environmental preservation. The printing policy level of the image forming system 10 can be easily changed by the administrator by selecting from the printing policy items 150. Also, by changing the level of the printing policies according to the intended use of the document data, the percentage of the printing in the erasable mode can be changed. Therefore, the purpose of using the printer is satisfied and the contribution to environmental preservation can be achieved.

According to at least one embodiment described above, the printing mode of the document data required to be printed is determined according to the printing policy of the image forming system. By automatically promoting printing in the erasable mode, it is possible to save the consumables and contribute to the environmental preservation.

Not limited to the image forming system in at least one of the embodiments described above, the system may include any optional device such as an erasing device which erases the printed image or a storage device in which the erased print image data is saved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming system, comprising:
a server including:
an interface that receives, from a user device, document data and instructions for printing the document data,
a storage section that stores the document data, and
a controller configured to function as
a printing mode determination section that determines a printing mode of the document data based on property information of the document data,
a selection section that selects, for printing the document data, only one of a non-erasable image forming section and an erasable image
forming section, based on the determined printing mode, and
a print controller that controls printing of the document data in the selected one of the non-erasable image forming section and the erasable image forming section in response to the received instructions,
wherein the selection section further includes an enforcing section that requires an input from a user before the document data is printed if the printing mode determination section determines the printing mode to be a non-erasable printing mode based on the property information, and if the received instructions include instructions to print in an erasable printing mode, and
wherein the print controller controls the erasable image forming section to print the document data if the enforcing section receives an enforced-printing input from the user, and controls the non-erasable forming section to print the document data if the enforcing section receives a non-enforced-printing input from the user.

2. The image forming system according to claim 1, wherein:
the printing mode determination section includes a setting section that sets a determination condition, and
the printing mode determination section determines the printing mode by comparing the property information with the set determination condition.

3. The image forming system according to claim 2, wherein the previously set determination condition can be changed.

4. The image forming system according to claim 3, wherein the setting section sets the determination condition as one of a plurality of predetermined levels of determination conditions.

5. The system according to claim 1, the controller further configured to function as:
a registration section configured to register the document data by storing the property information in a document registration list.

6. The system according to claim 1, wherein the property information includes a frequency of preset confidentiality keywords.

7. An image forming method, comprising:
receiving, from a user device, document data and instructions to print the document data;
determining a printing mode based on property information of the document data;
selecting, for printing the document data, only one of a non-erasable image forming section and an erasable image forming section, based on the determined printing mode;

if the determined printing mode is a non-erasable printing mode based on the property information, and if the received instructions include instructions to print in an erasable printing mode, requesting and receiving an input from a user before the document data is printed; and controlling printing of the document data in the selected one of the non-erasable image forming section and the erasable image forming section in response to the received instructions, wherein if the received input from the user is an enforced-printing input, the erasable image forming section prints the document data, and if the received input from the user is a non-enforced-printing input, the non-erasable forming section prints the document data.

8. The method according to claim 7, further comprising:
setting a determination condition, wherein determining the printing mode comprises comparing the property information with the set determination condition.

9. The method according to claim 7, further comprising:
registering the document data by storing the property information in a document registration list.

10. The method according to claim 7, wherein the property information includes a frequency of preset confidentiality keywords.

11. An image forming system, comprising:
a control section configured to receive, from a user device, document data and instructions to print the document data;
a printing mode determination section configured to determine a printing mode of the document data based on property information of the document data;
a selection section configured to select, for printing the document data, only one of a non-erasable image forming section and an erasable image forming section based on the determined printing mode; and
a print controller configured to control printing the stored document data in the selected one of the non-erasable image forming section and the erasable image forming section in response to the received instructions, wherein the selection section further includes an enforcing section that requires an input from a user before the document data is printed if the printing mode determination section determines the printing mode to be a non-erasable printing mode based on the property information, and if the received instructions include instructions to print in an erasable printing mode, and wherein the print controller controls the erasable image forming section to print the document data if the enforcing section receives an enforced-printing input from the user, and controls the non-erasable forming section to print the document data if the enforcing section receives a non-enforced-printing input from the user.

12. The image forming system according to claim 11, wherein:
the printing mode determination section includes a setting section configured to set a determination condition, and
the printing mode determination section determines the printing mode by comparing the property information with the set determination condition.

13. The image forming system according to claim 12, wherein the previously set determination condition can be changed.

14. The image forming system according to claim 13, wherein the setting section sets the determination condition as one of a plurality of predetermined levels each having predefined determination conditions.

15. The system according to claim 11, further comprising:
a registration section configured to register the document data by storing the property information in a document registration list.

16. The system according to claim 11, wherein the property information includes a frequency of preset confidentiality keywords.

17. The system according to claim 11, wherein the property information of the document data includes a document name, a file application, a document distribution destination, a document type, a number of pages, a registrant code, and a frequency of preset confidentiality keywords.

* * * * *